Oct. 27, 1925.

H. R. STRATFORD

METHOD OF SURFACING

Filed Dec. 15, 1924

1,558,714

INVENTOR.
Herbert R. Stratford
BY
ATTORNEYS

Patented Oct. 27, 1925.

1,558,714

UNITED STATES PATENT OFFICE.

HERBERT R. STRATFORD, OF CLEVELAND, OHIO, ASSIGNOR TO THE STRATMORE COMPANY, OF CLEVELAND, OHIO, A CORPORATION OF OHIO.

METHOD OF SURFACING.

Application filed December 15, 1924. Serial No. 756,082.

*To all whom it may concern:*

Be it known that I, HERBERT R. STRATFORD, a citizen of the United States, and a resident of Cleveland, county of Cuyahoga, and State of Ohio, have invented a new and useful Improvement in Methods of Surfacing, of which the following is a specification, the principle of the invention being herein explained and the best mode in which I have contemplated applying that principle, so as to distinguish it from other inventions.

The present invention relating, as indicated, to a method of surfacing, is more particularly directed to an improved method for conditioning the surfaces of pressed metal and other panels for use in motor car bodies and for similar purposes for the reception of paint and varnish coats.

The principal object of the invention is to rapidly and economically level the surface of such a panel for the purpose of removing natural irregularities therein or others such, for example, as slight projections or seams caused in the case of a pressed metal panel by bumping out any dented portions of the panel caused from improper handling, and in other cases from the action of the metal under the dies. A third purpose is to so condition a metal surface that it shall be in substantially uniform and roughened condition which will assist the metal in holding and maintaining the initial priming coats of paint which are applied thereto. To the accomplishment of the foregoing and related ends, said invention, then, consists of the means and method hereinafter fully described and particularly pointed out in the claims.

The annexed drawing and the following description set forth in detail one approved method of carrying out the invention, such disclosed mode, however, constituting but one of the various ways in which the principle of the invention may be used.

In said annexed drawing:—

Figure 1:
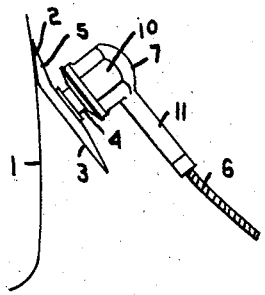
Figure 2:
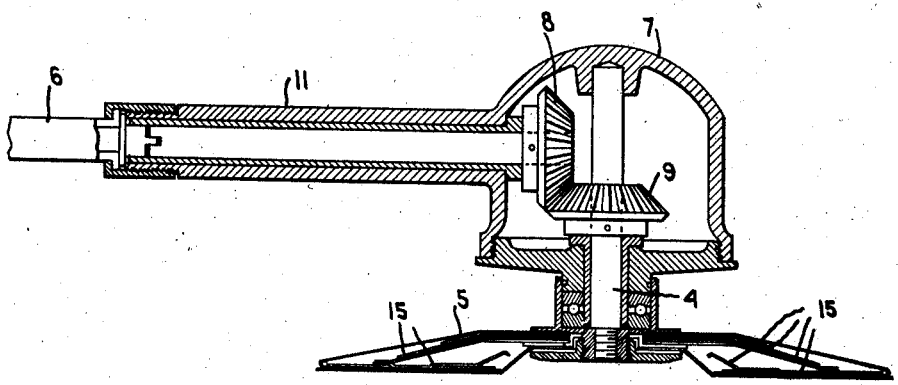

Fig. 1 is a side elevation showing an apparatus for carrying out the present method in conjunction with the panel being operated upon, and Fig. 2 is a transverse section through the apparatus shown in Fig. 1.

For illustration I shall describe the present method in its application to a pressed metal panel for use in an automobile body. At present metal panels such as are used in building up the body for a motor car or for many other purposes, are first pressed to the desired shape under dies and are then prepared for the paint coats by having all indentations in the surface to be painted bumped outwardly which ordinarily forces the metal outwardly too far, producing a projection. After this operation workmen file down either the entire surface of the panel or, in some cases, only those portions which show projections, which are called "stretcher seams," produced by uneven flowing of the metal under the dies. The surface of the panel can be taken down sufficiently to make it level, that is, to remove the slight projections, and in the case of seams, to remove sufficient metal adjacent thereto to cut down the surface to a point at least level with the bottom of this seam. This filing operation is extremely laborious and expensive, but up to the present time no alternative method has been produced which will both remove the irregularities in the surface and at the same time properly condition the surface for receiving the priming coats.

The present method involves forcing against a relatively small portion of the metal panel a flexible and yieldingly supported surfacing element such, for example, as an abrasive covered disc of fiber, cloth or the like, while moving the contacting portion of this abrasive element at an extremely high rate of speed and then removing the abrasive element from the particular portion of the surface worked on before this portion of the metal has been raised to a temperature that will cause warping or such expansion of the metal as might result in a bulge in the metal panel at that point. Thus, in Fig. 1 there is shown a metal panel 1, against which there is pressed a portion 2 of a flexible abrasive covered disc 3 which is secured at its center to the shaft 4 and which is yieldingly supported throughout its operating portion by a flexible resilient support 5. The shaft 4 and the support 5, as well as the abrasive element itself, are secured in a housing 7 and are rotated by the flexible shaft 6 which is carried to the frame or head 7 where it drives the shaft 4 through bevel gears 8 and 9. The frame 7 is provided with suitable handles 10 and 11 by which the operator holds the machine against the work, thus giving him a quite accurate control of the operation as he can both vary the pressure of the abrasive against the work or vary the angle at which the machine works, which is substantially equivalent to varying the pressure, and also move the operating portion of the abrasive disc from point to point over the surface of the panel in order to prevent the warping which results in the case of certain metal panels if the disc is held in one position too long.

In operating upon metal surfaces with moving abrasive elements the standard operating speeds are given in various textbooks as not higher than 4,500, or at the most 5,000 surface feet per minute and these speeds are for rigid discs or for solid wheels. The applicant has found that in working upon metal panels for the purposes described above it is necessary at speeds around 4,500 feet per minute, or below, to apply a very considerable pressure upon the abrasive element to force it against the panel and to cause it to cut down the metal. With this increased pressure between the disc and the metal the friction is increased so much that a metal surface rapidly heats and attains a warping temperature before the surface has been sufficiently reduced, with the result that while the surface is smooth the panel will show various irregularities in the form of projections. In other words, the action of an abrasive element upon a metal panel at the speeds which have ordinarily been used and which are stated as being satisfactory operating speeds for working on metal, destroys the very object for using the machine since, while certain irregularities on the surface are removed, others are again produced by the heating action of the abrasive element. It is therefore necessary to move the abrasive element over the metal surface at an extremely high rate of speed and one which will permit the metal of the surface to be so rapidly cut away that the abrasive element may be moved to another portion of the surface before the metal of the panel has been heated to a warping temperature and this is particularly true with metals such as aluminum, although it is also true to a lesser extent with steel which is the metal commonly used in automobile body panels and for similar purposes.

It has been found necessary in operating upon metal surfaces to move the abrasive element at a speed in excess of 4,500 surface feet per minute and it is highly desirable that this speed be as high as 5,500 to 6,500 surface feet per minute. At these speeds the ordinary operator can satisfactorily condition the surface of a panel without either applying too great pressure against the metal, which is a very trying operation for him, or without moving the machine too rapidly from point to point over the metal panel. When operated as described it has been found that the present machine can be utilized to rapidly and very economically cut down projections on the metal surface, and also cut down the surface adjacent the seams and irregularities to produce a regular and smooth surface. The surface which is produced is smooth only in the sense that there are no noticeable or objectionable projections or indentations. The surface is often not smooth, in the sense that it contains a multitude of very fine ridges produced by the action of the grains on the abrasive element, which enable the priming coats to grip the surface very much better than would be possible if the surface were uniformly smooth, and hence lock into the metal the priming coat and the subsequent coats of varnish.

The machine which is shown in Fig. 2 in section illustrates, of course, but one of various forms of apparatus which may be employed to carry out the present invention and this machine, therefore, need not be described in great detail. Attention, however, is called to the yielding support which rotates with the shaft 4 and which backs up and supports the abrasive disc and produces the pressure which forces a portion of this disc against the surface that is to be operated upon. This yielding support consists of a series of overlapping resilient fingers or arms 15, the lower surface of which is covered by means of a relatively thin but yielding member 16 consisting of rubberized fabric or similar material against which the abrasive disc 3 is supported.

The normal condition of the yielding support is shown in Fig. 2 in which the various overlapping fingers are shown to terminate in a flat circular portion lying in one plane at right angles to the axis of the driving shaft 4 and beyond the same so that the central portion of the disc is recessed for attachment to the end of the driving shaft 4. It is desirable with this construction to operate the machine by pressing a segment of the abrasive disc against the surface of the panel, by holding the machine at an angle to the surface, as shown in Fig. 1. The unit pressure of the abrasive surface against the panel may be increased by tilting the machine farther away from the panel, the increase in pressure thus produced increasing as this angle is increased; the yielding support being so constructed as to give a uniform pressure all over the operating segment of the abrasive disc. The operator then moves the machine back and forth over the surface of the panel, either vertically, horizontally or in any desired path, and the disc which is rotating at a rate of speed in excess of 4,500 feet per minute, the speed being calculated for a point midway between the radially inner and outer boundaries of the operating segment, rapidly cuts away the metal, grinding it down to a relatively smooth surface without producing any scratches or irregularities which are either noticeable upon completion of the surfacing operation or noticeable subsequently after any of the various coats of paint or varnish have been applied.

The speed at which the disc should be rotated, in the event that a disc is employed for the abrasive element, should be as already stated in excess of 4,500 feet per minute, and still better a speed of above 5,000, or even 5,500 feet per minute calculated at the outer edge of the disc, while the upper limit of the operating speed range is that speed at which the centrifugal force acting on the disc becomes so high that the disc is practically a solid member and hence refuses to yield as the machine is pressed against the work. If the disc becomes essentially solid, as is the case at extremely high speeds, either the machine must be used perfectly flat, in which case it will not satisfactorily operate upon curved surfaces which are numerous in the panels used for automobile bodies, or if the machine is tilted at even a slight angle then one edge of the discs will engage the metal surface and will produce deep ridges.

The size of the grains used on the abrasive surface should, of course, be properly suited to the panel that is being conditioned and will vary depending upon whether the panel is brass, steel, aluminum or other material, but the speed should be maintained between the limits already stated. It is absolutely essential that the abrasive disc be itself sufficiently flexible to bend through an angle which is rarely more than 30 degrees, and it must be flexibly supported while being bent through this angle and out of its normal plane. If it is not flexibly supported then it will either scratch or mar the work or it will be unable to accommodate itself to curves in the panels with the result that at such curves too much metal will be taken off and in the case of sharp curves the curve itself will be flattened out while additional time will be required to condition each portion of the panel.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of surfacing metal panels, the steps which consist in forcing against a relatively small portion of the metal surface a flexible and yieldingly supported abrasive disc with a force sufficient to flex said disc and then rotating such abrasive disc at a speed higher than that causing heating of the metal to the warping temperature but below the speed at which the abrasive disc is converted into a non-yielding element by the action of centrifugal force.

2. In a method of surfacing metal panels, the steps which consist in forcing against a relatively small portion of the metal surface the radially outer portion of a flexible and yieldingly supported abrasive disc with a force sufficient to flex such contacting portion of said disc and to cause the same to remove the surface metal therefrom when rotated while in contact therewith at a speed in excess of 4,500 feet per minute.

Signed by me, this 12th day of December, 1924.

HERBERT R. STRATFORD.